Nov. 10, 1964          L. E. ELPHEE          3,156,013
SEPARATOR UNIT FOR INJECTION CYLINDER
Filed June 26, 1961

INVENTOR.
LEON E. ELPHEE
BY
ATTORNEY 3,156,013
SEPARATOR UNIT FOR INJECTION CYLINDER
Leon E. Elphee, Lakewood, Ohio, assignor to Portage
Machine Company, Akron, Ohio
Filed June 26, 1961, Ser. No. 119,501
1 Claim. (Cl. 18—30)

This invention relates to the art of plastic injection machines and in particular relates to an improvement in the separator unit that is used in connection with machines of this type.

In the known prior art of plastic extruding it has long been known that granular plastic material, for example, can be fed from a hopper into the path of plunger means that cause the same to move through a heated flow passage. In the normal instance, a cylindrical tube or other guide means is provided in such heated flow passage for the purpose of directing the granular material through the same, with heat being provided during such movement so that granular plastic will be converted into a flowable plastic material that can be molded or otherwise formed upon emission from the discharge nozzle or end of the injection cylinder.

While plastic separators of this type have been known in the past, the same have been significantly characterized by difficulty in providing a completely homogeneous flowable plastic material.

Specifically, it has been found that in the conventional instance wherein the separator unit is formed with flutes that extend longitudinally thereof, that the natural tendency of heat to rise will cause more heat to be applied to plastic received in the top or upper portion of the heated flow passage than will be received by the material that is received in the lower portion. Thus, there occurs, in effect, an uneven treatment of the material being plasticized, with the result that material in the upper portion of the passage is overheated, while the material in the lower portion is underheated.

It has been found that the aforementioned difficulties can be obviated by providing at least one projecting rib on the separator cylinder, with the projecting rib or ribs, as the case may be, each being arranged in helical fashion so as to, in effect, form a screw thread. In the preferred instance, a plurality of such ribs will be provided, with it being found that particularly good results can be obtained with the use of three ribs spaced 120 degrees apart.

With the use of three ribs there is, in effect, formed a triple lead screw thread and the length of the ribs is such that the same approximately equals the pitch distance of the helical wound ribs. In this fashion, material passing between any adjacent ribs is equally exposed to the relatively high and low temperatures of the top and bottom zone, with the result that all material being plasticized will be subjected to the application of a uniform amount of heat.

It has additionally been found that greater efficiency in heat transfer can be provided by making the nose portion of the separator unit (this refers to the part first contacted by the advancing material being plasticized) of a high heat conductive material such as beryllium and forming the same in a rearwardly flaring conical form so as to provide a heated guide means that will direct the advancing material into the channels that are defined by the aforementioned rib members and the flow passage.

In this regard, it is preferable that the major diameter (considering the ribs as screw threads) of the ribs progressively decrease from the nose portion rearwardly and further that the flow passage be tapered so as to be in complemental engagement at all times with the rib members. In this regard, the ribs and wall should preferably be machined to the same dimension so as to snugly fit together and thus eliminate voids that might prevent purging of the separator when desired. The separator unit in such instances can be shrunk by cooling and then inserted in the heated, and accordingly expanded, flow passage, with the result that upon cooling the separator unit will be non-rotatably positioned in concentricity with the flow passage. Thus, a closed guide channel defined by adjacent ribs, the cylinder and the wall of the flow passage will be provided and each of the guide channels will progressively decrease in volume towards the rear or trailing end of the separator unit so as to progressively compress the advancing plastic and fully mix the same. Such progressive compression will occur simultaneously with the continuous tumbling action that results from passing through the spiral chambers, with the result that maximum admixing of the plastic occurs during travel thereof through the flow passage. Additionally, it will be noted that the use of such guide channels serves to provide a maximum amount of surface area in contact with the plastic material, with the result that a greater amount of plastic can be plasticized by the improved separator unit due to the increased amount of heated surface that is in contact with the plastic being plasticized.

Production of an improved separator unit having the above described advantages accordingly becomes the principal object of this invention, with other objects becoming more apparent upon a reading of the following brief specification, considered and interpreted in the light of the accompanying drawings.

Figure 2:
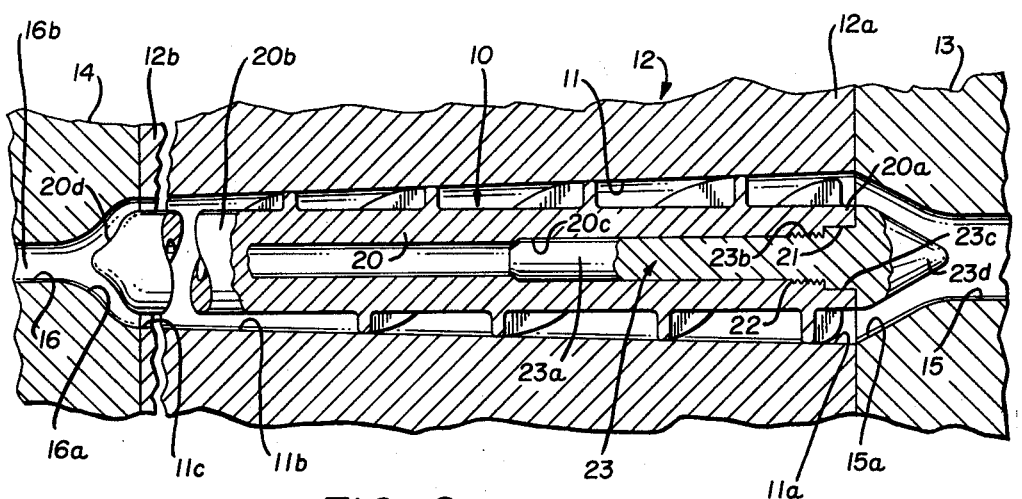
FIGURE 2 is a side elevational of the separator unit and illustrates the same positioned within the component parts of a schematically illustrated injection mechanism.

Referring now to the drawings and in particular to FIGURE 2 thereof, the improved separator unit, generally designated by the numeral 10, is shown positioned within the flow passage 11 of an injection unit 12, with the flow passage 11 being heated in conventional fashion so as to effectuate the transfer of heat to material advancing through the flow passage 11. While the injection unit 12 has been indicated generally by the numeral 12, it is to be understood that the same is, in fact, of multiple part construction in known fashion so as to include a nose cover 13 and a rear cover plate 14, with the just described members 13 and 14 being secured to the axial ends 12a and 12b of the injection unit 12 in known fashion.

In this regard, it should also be noted that the heated flow passage 11 is adjoined by passages 15 and 16 that are respectively provided in the nose and rear cover members 13 and 14, with the passage 15 receiving granular material from a hopper (not shown) and advancing the same towards the nose portion of the separator unit by means of a conventional plunger or ram, while the passage 16 receives material that is discharged from the end of the passage 11 that is provided in the end 12b.

Accordingly, and again referring to FIGURE 2, it will be noted that the passage 15 has an outwardly flared wall portion 15a that concentrically adjoins the end 11a of passage 11, as clearly shown in FIGURE 2. Similarly, the passage 16 includes a flared mouth opening 16a that concentrically adjoins the end 11b of the passage 11, with the flared end 16a terminating in a discharge passage 16b through which the plasticized material may be directed.

Figure 1:
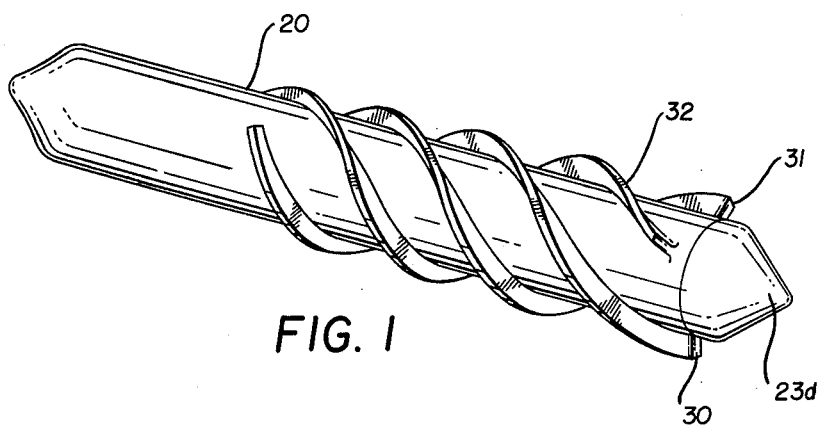
FIGURE 1 is a perspective view of the improved separator unit.
Figure 3:
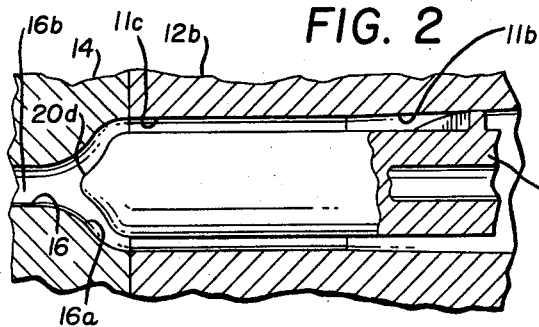
FIGURE 3 is a sectional view showing a localized portion of the heat flow passage.

In this regard, it should be further noted that the preferred form of the invention contemplates that the passage 11 has a taper throughout a substantial portion of its axial length. More specifically, the passage 11 goes from a maximum diameter portion 11a adjacent the cylinder end 20a to a minimum diameter 11b that is spaced axially inwardly from the opposed ends of the passage 11. This condition is best shown in the partial section of FIGURE 3 of the drawings, with it being noted that the broken away portion of FIGURE 2 precludes illustration of the type shown in FIGURE 3. In this fashion, a straight bored portion 11c will be provided concentric with the cylinder portion 20b and preferably the volumetric capacity of the space between the surface 11c and the cylinder portion 20b approximates, from a volume standpoint, the charge that is to be delivered. In this regard, it has been found that this portion will serve as a "final staging" area for the plastic being plasticized so that all three passages for plastic, as will be described, merge into the staging area defined by the surface area 11c, with introduction to this staging area being through the tapering wall surface that is to the right of the minimum diameter point 11b, as shown in FIGURE 3. Also, and as indicated in FIGURE 1, the minimum diameter point 11b is preferably spaced some distance from the end of the threads that will be described so as to cause the existence of a prestaging area, as is shown in the drawings.

Cylinder 20 also has an opposed end 20a as shown in FIGURE 2 with the end 20a being bored and threaded as at 21 and 22 so as to receive a nose element that is indicated generally by the numeral 23. Referring again to FIGURE 2, the nose element 23 is shown as including a shank portion 23a that is received and seated within the bore 20c of cylinder 20, with the member 23 further including a threaded segment 23b and an enlarged cylindrical shank portion 23c that respectively engage with the previously described surfaces 22 and 21. The projecting nose 23d of the member 23 is shown formed of generally conical configuration so as to be substantially complemental with respect to the tapering wall section 15a, as is clearly shown in FIGURE 2 of the drawings. As has been indicated above, it is preferable that the nose element 23 be made of a highly heat conductive material, such as beryllium, so that heat provided by the separator 12 will be concentrated in the nose portion 23d, with the result that the maximum heat will be initially applied to material approaching the separator unit 10, while simultaneously preventing overheat in the intermediate portions of the passage, with heat that should otherwise accumulate therein being conducted to the nose element where the cold plastic will absorb the same.

As has been indicated above, the rearwardly presented end 20b is also provided with a tapering surface 20d that is substantially complemental in contour to the tapering surface 16a so that material leaving the separator unit will be directed uniformly into the discharge passage 16b.

In addition to the aforementioned component parts, the illustrated form of the separator unit 10 further includes projecting rib members 30, 31 and 32, with each of these rib members 30, 31 and 32 being spaced 120 degrees from each other with respect to the axis of the cylinder 20, and with each of the rib members 30, 31 and 32 further being arranged in helical fashion around the external wall of the cylinder 20 so as to, in effect, provide a multiple thread on the exterior of the cylinder 20. As shown in FIGURE 2, and considering the rib members 30, 31 and 32 as being analogous to thread elements, the major diameter of each member progressively decreases from a maximum diameter adjacent the nose end 20a to a minimum diameter adjacent the rearwardly disposed end 20b. In this fashion, the ribs will continuously engage the wall of the tapering flow passage 11, with the result that a series of continuous guide channels will be defined by adjacent ribs coacting with the cylinder 20 and the flow passage 11. As a result of this progressive decrease in major diameter, these guide channels will have their maximum volume adjacent the nose end 20a and will decrease to a minimum volume adjacent the rearwardly disposed end 20b. As previously indicated, this progressive decrease in volume coupled with the fact that the advancing plastic is exposed to a relatively great amount of surface area insures full admixing of the plastic. It should be further noted that each rib 30, 31 and 32 is shown completing at least one revolution around the periphery of the cylinder 20 and in this fashion material flowing through any guide channel defined by any rib will flow through both the hot and cold zones of the flow passage 11 so as to be uniformly plasticized into a homogeneous mixture. In this regard, and by using three such leads, all material emitting into the discharge passage 16b will have been exposed to an exactly equal amount of heat during travel through the flow passage 11, with the result that all material entering the discharge passage will be uniform in consistency and will be completely and homogeneously plasticized. It will further be noted that the clearance between wall 11b and the rear end 20b of the cylinder 20 is minimal so that any unplasticized material would be "ironed out" before passing through this space towards the discharge end.

While the operation of the device is apparent from the above description, it should be noted that material approaching the separator unit 10 from the passage 15 will first be diverted outwardly by the nose end 23d of the nose element 23 upon continued axial movement in response to motivating pressure applied in known fashion to material remaining in the passage 15, the material will be equally directed into the three guide channels defined by the ribs 30, 31 and 32. The material entering any guide channel will make a full spiral circle around the periphery of the cylinder 20 and then will be discharged into the passage 16b for delivery through a discharge spout in known fashion.

During the movement just described, it will be noted that the maximum amount of heat will be directed against the advancing material in its initial stage of contact with the separator 10 by virtue of the fact that the nose element 23, being highly conductive of heat, will direct heat against the material that comes in contact with the same. It will be further noted that during the course of spiraling around the periphery of the cylinder 20, that the material entrapped in the guide channel will pass through both the hot and cold zones of the flow passage 11, with the result that all material will be subjected to an exactly equal amount of temperature during the plasticizing thereof.

It will be noted that as the material advances along the separator unit 10, that the same will become more concentrated due to the progressively decreasing volume of the guide channels with the material reaching its maximum heat and concentration just prior to entering the discharge passage 16.

While a full and complete description of the invention has been set forth in accordance with the dictates of the Patent Statutes, it is to be understood that the invention is not intended to be limited to the specfic embodiment herein shown. Accordingly, modifications of the invention may be resorted to without departing from the spirit hereof or the scope of the appended claim.

What is claimed is:

A separator unit for use in the heated flow passage of an injection unit of the character described, comprising:
- (A) an elongate cylinder having
  - (1) a nose end including a projecting nose element that directs the material flowing through said passage onto the exterior of said cylinder,
  - (2) and a rearwardly disposed end,
  - (3) and further having a substantially constant diameter throughout its longitudinal extent between said longitudinal ends;
- (B) at least one rib member
  - (1) projecting radially from the exterior in continuous helical form so as to define a screw thread
    - (a) having a pitch of at least one,
    - (b) and having a major diameter that decreases from a maximum dimension adjacent said nose end to a minimum dimension adjacent said rearwardly disposed end;
(C) said flow passage having an internal diameter that varies complementally with the major diameter of said screw thread formed by said rib
  (1) whereby said separator unit may be non-rotatably and removably positioned in said flow passage;
(D) said rib, said cylinder and said flow passage defining a continuous uninterrupted helical guide channel that progressively decreases in volume throughout its longitudinal extent and through which material may be advanced;
(E) said nose element being
  (1) detachably secured to said cylinder and
  (2) having a portion thereof projecting beyond the point of juncture of said rib with said cylinder
  (3) said projecting portion being constructed of material of greater heat conducting properties than said cylinder.

References Cited in the file of this patent

UNITED STATES PATENTS

| | | |
|---|---|---|
| 2,462,308 | Dinzl | Feb. 22, 1949 |
| 2,482,243 | Burnham | Sept. 20, 1949 |
| 2,669,750 | Keeney | Feb. 23, 1954 |
| 2,724,146 | Smith | Nov. 22, 1955 |

FOREIGN PATENTS

| | | |
|---|---|---|
| 884,465 | Great Britain | Dec. 13, 1961 |
| 1,237,535 | France | June 20, 1960 |